(12) United States Patent
Yoshida et al.

(10) Patent No.: US 12,043,080 B2
(45) Date of Patent: Jul. 23, 2024

(54) FRONT SUSPENSION DEVICE

(71) Applicant: MAZDA MOTOR CORPORATION, Hiroshima (JP)

(72) Inventors: Shohei Yoshida, Hiroshima (JP); Koshi Takahashi, Hiroshima (JP); Hiroyuki Takahashi, Hiroshima (JP); Kota Okano, Hiroshima (JP); Yosuke Sawada, Hiroshima (JP); Hiromasa Honji, Hiroshima (JP); Kosuke Mukaigawa, Hiroshima (JP); Ichiro Tanabe, Hiroshima (JP); Ryota Hanate, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/173,201

(22) Filed: Feb. 23, 2023

(65) Prior Publication Data
US 2024/0092130 A1    Mar. 21, 2024

(30) Foreign Application Priority Data
Sep. 20, 2022    (JP) .................................. 2022-148806

(51) Int. Cl.
*B60G 7/02*    (2006.01)
*B60G 7/00*    (2006.01)
*B60G 13/00*    (2006.01)

(52) U.S. Cl.
CPC ............. *B60G 7/001* (2013.01); *B60G 7/008* (2013.01); *B60G 7/02* (2013.01); *B60G 13/003* (2013.01);
(Continued)

(58) Field of Classification Search
CPC .......... B60G 7/001; B60G 7/008; B60G 7/02; B60G 13/003; B60G 13/005; B60G 2206/01; B60G 2206/016
See application file for complete search history.

(56) References Cited

U.S. PATENT DOCUMENTS

| 9,789,743 B2 * | 10/2017 | Donkai ................... B60G 7/005 |
| 10,822,027 B2 * | 11/2020 | Karlsson ................... B62D 7/18 |
| 2019/0077207 A1 | 3/2019 | Kanamaru et al. |

FOREIGN PATENT DOCUMENTS

| DE | 102020121159 A1 * | 2/2022 | ............. B60G 7/001 |
| EP | 3785950 A1 * | 3/2021 | ............... B60G 3/06 |

(Continued)

OTHER PUBLICATIONS

Baier, Feb. 2022, DE-102020121159-A1, Machine Translation of Specification.*

*Primary Examiner* — Amy R Weisberg
*Assistant Examiner* — Matthew Joseph Ganci
(74) *Attorney, Agent, or Firm* — Studebaker & Brackett PC

(57) ABSTRACT

A front suspension device comprises a suspension arm, one end of which has a front-wheel support portion to support a front wheel of a vehicle and the other end of which is positioned on an inward side, in a vehicle width direction, of the front-wheel support portion and has a vehicle-body attachment portion to be attached to a vehicle-body member of the vehicle and a damper supported at a damper support portion which is provided at a portion of the suspension arm which is positioned in the vicinity of the front-wheel support portion at a lower portion thereof and connected to the vehicle-body member at an upper portion thereof. The damper support portion of the suspension arm has a breakage ease portion to cause breakage of the suspension arm.

9 Claims, 14 Drawing Sheets

(52) U.S. Cl.
CPC ........ *B60G 13/005* (2013.01); *B60G 2206/01* (2013.01); *B60G 2206/81022* (2013.01)

(56) References Cited

FOREIGN PATENT DOCUMENTS

| | | | |
|---|---|---|---|
| JP | 2019-051785 A | 4/2019 | |
| WO | WO-2016148633 A1 * | 9/2016 | ............... B60G 3/06 |

* cited by examiner

FRONT SUSPENSION DEVICE

BACKGROUND OF THE INVENTION

The present invention relates to a front suspension device.

Conventionally, a small overlap collision in which a vehicle hits against an obstacle at an outward side, in a vehicle width direction, of a front side frame is known as a form of a vehicle frontal collision. In this small overlap collision, there is a case where a front wheel moves rearwardly and hits against a vehicle-body member which is positioned on a vehicle rearward side of the front wheel. In this case, there is a concern that a collision load may be applied to a cabin.

As countermeasures of this small overlap collision, Japanese Patent Laid-Open Publication No. 2019-51785 (US2019/0077207 A1), for example, discloses a structure in which a fragile portion is provided at a portion of a suspension arm which is positioned in the vicinity of a vehicle attachment portion, so that when a load having a specified value or greater is applied to the front wheel from a vehicle front side, the suspension arm is bent at this fragile portion such that the front wheel is rotated rearwardly around the fragile portion.

According to the structure disclosed in the above-described patent document, the front wheel can be rotated around the fragile portion outwardly, in the vehicle width direction, by bending the suspension arm at the fragile portion. Thereby, it is expected that the collision load applied to the cabin via the front wheel can be reduced as much as possible.

However, it became apparent from the study conducted by the inventors of the present invention and others that while the front wheel was rotated outwardly, in the vehicle width direction, according to a progress of the small overlap collision, a side sill positioned on the vehicle rearward side was deformed relatively greatly. Accordingly, there is room for improvement of suppressing this deformation of the vehicle body so as to suppress the load transmission to the cabin.

SUMMARY OF THE INVENTION

The present invention has been devised in view of the above-described matter, and an object of the present invention is to provide a front suspension device which can properly suppress the deformation of the vehicle body as much as possible in the small overlap collision.

The present invention is a front suspension device, comprising a suspension arm, one end of which has a front-wheel support portion to support a front wheel of a vehicle and the other end of which is positioned on an inward side, in a vehicle width direction, of the front-wheel support portion and has a vehicle-body attachment portion to be attached to a vehicle-body member of the vehicle, and a damper supported at a damper support portion which is provided at a portion of the suspension arm which is positioned in the vicinity of the front-wheel support portion at a lower portion thereof and connected to the vehicle-body member at an upper portion thereof, wherein the damper support portion of the suspension arm has a breakage ease portion to cause breakage of the suspension arm.

According to the present invention, a rearwardly-directed load is applied to the front wheel in the small overlap collision, so that the rearwardly-directed load is applied to the front-wheel support portion of the suspension arm. Since an inward end portion of the suspension arm is connected to the vehicle body at the vehicle-body attachment portion, when the rearwardly-directed load is applied to the front-wheel support portion, the suspension arm is curved and deformed such that an outward side, in the vehicle width direction, thereof is positioned on the more rearward side of the vehicle. Herein, since the damper is connected to the vehicle body, the damper support portion to support the damper is not displaced easily in a portion of the suspension arm which is positioned in the vicinity of the front-wheel support portion. Meanwhile, another portion of the suspension arm which is positioned on the outward side, in the vehicle width direction, of the damper support portion is displaced greatly compared to the damper support portion. Accordingly, the collision load concentrates at the damper support portion, so that the suspension arm gets broken at a position of the breakage ease portion of the damper support portion. Consequently, the front wheel becomes movable independently from the vehicle body.

Meanwhile, since the suspension arm is curved and deformed, a reaction force including a laterally-directed element is applied to the vehicle body from the suspension arm. In particular, if the load is applied to the suspension arm even after its breakage, a laterally-directed force which acts in a direction away from the front wheel comes to be applied to the vehicle body. Thereby, the vehicle body moves laterally (so-called glance-off), and the front wheel and the vehicle body leave (separate from) each other.

Consequently, since the vehicle body is suppressed from being deformed by the front wheel, the deformation of the vehicle body in the small overlap collision can be properly suppressed.

In an embodiment of the present invention, the damper support portion of the suspension arm has a hole portion which stores a lower end portion of the damper and penetrates in a vehicle longitudinal direction, and the breakage ease portion is provided at another portion of the damper support portion than the hole portion.

According to this embodiment, the portion where the breakage ease portion is provided has a thin thickness, compared to any other portion of the suspension arm. Accordingly, since the suspension arm is caused to get broken easily at the breakage ease portion in the small overlap collision, the deformation of the vehicle body in the small overlap collision can be suppressed more effectively.

In another embodiment of the present invention, the breakage ease portion is positioned at both points of the damper support portion which are located on an upper side and a lower side of the hole portion, respectively.

According to this embodiment, the suspension arm is caused to get broken easily at the breakage ease portion in the small overlap collision. Thereby, the deformation of the vehicle body in the small overlap collision can be suppressed more effectively.

In another embodiment of the present invention, the breakage ease portion is a groove portion which is configured to be recessed in a vehicle longitudinal direction.

That is, since the collision load in the small overlap collision is a load which is directed from the vehicle forward side to the vehicle rearward side, the structure of this embodiment causes the breakage of the suspension arm at the breakage ease portion more easily. Thereby, suppression of the deformation of the vehicle body in the small overlap collision can be attained more effectively.

In another embodiment of the present invention, a rear face portion of an outside portion of the suspension arm which extends from the damper support portion to the front-wheel support portion is of an arch shape which is curved toward a vehicle forward side in a plan view.

According to this embodiment, the outside portion is deformed easily such that a front face portion is bent in a ridge-holding manner due to the collision load in the small overlap collision. Therefore, if the breakage ease portion is provided at the damper support portion, the suspension arm is deformed easily at the breakage ease portion. Thereby, the deformation of the vehicle body in the small overlap collision can be suppressed more effectively.

In another embodiment of the present invention, the breakage ease portion is a groove portion which is formed at a front face portion of the damper support portion and configured to be recessed in a vehicle longitudinal direction.

According to this embodiment, when the front face portion is deformed in the ridge-holding manner, the breakage ease portion causes the breakage of the suspension arm especially. Thereby, the suppression of the deformation of the vehicle body in the small overlap collision can be attained more effectively.

In another embodiment of the present invention, a position, in the vehicle width direction, of the breakage ease portion is the same as a position, in the vehicle width direction, of a curve top portion of the rear face portion which is positioned on a foremost side.

According to this embodiment, since the front face portion is easily deformed in the ridge-holding manner at the position of the breakage ease portion, the breakage ease portion causes the breakage of the suspension arm. Thereby, the deformation of the vehicle body in the small overlap collision can be suppressed more effectively.

In another embodiment of the present invention, the suspension arm is formed by forging.

According to this embodiment, since the rigidity of a whole part of the suspension arm can be increased, the support performance of the suspension arm in a normal state can be sufficiently improved. Further, increasing of the rigidity of the whole part of the suspension arm can easily cause breakage of a portion which has the lower rigidity than any other portion like the breakage ease portion. Moreover, since a residual portion of the suspension arm after the breakage does not have buckling easily, a laterally-directed force which is caused by compressive deformation of the residual portion can be effectively generated, so that the suppression of the deformation of the vehicle body in the small overlap collision can be attained more effectively.

As described above, the front suspension device according to the present invention can properly suppress the deformation of the vehicle body as much as possible in the small overlap collision.

The present invention will become apparent from the following description which refers to the accompanying drawings.

DETAILED DESCRIPTION OF THE INVENTION

Figure 1:
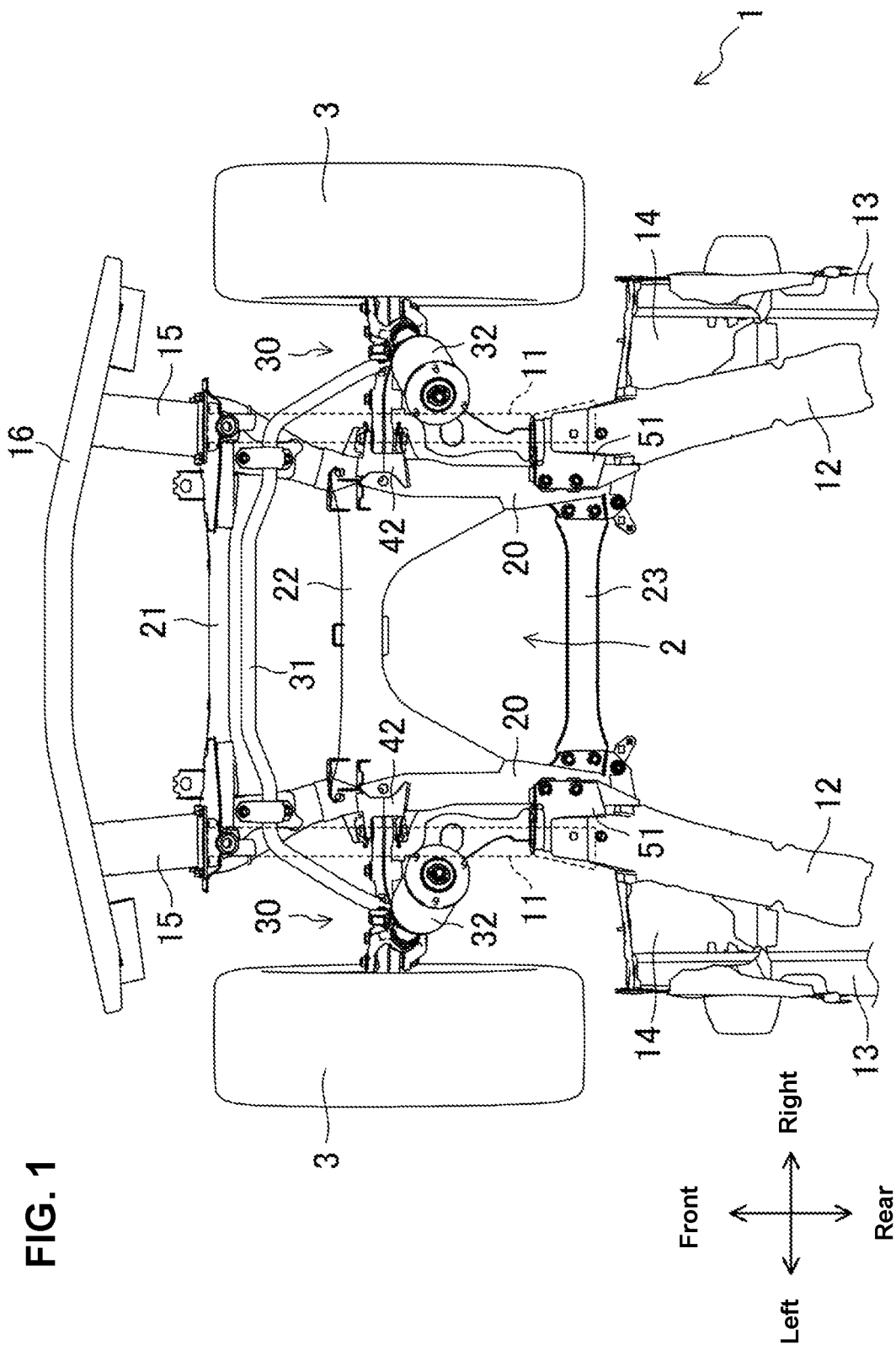
FIG. 1 is a plan view showing a major part of a front portion of a vehicle where a suspension device according to an exemplified embodiment is installed.

Hereafter, an exemplified embodiment will be described specifically referring to the drawings.

(Vehicle Front Structure)

Figure 2:
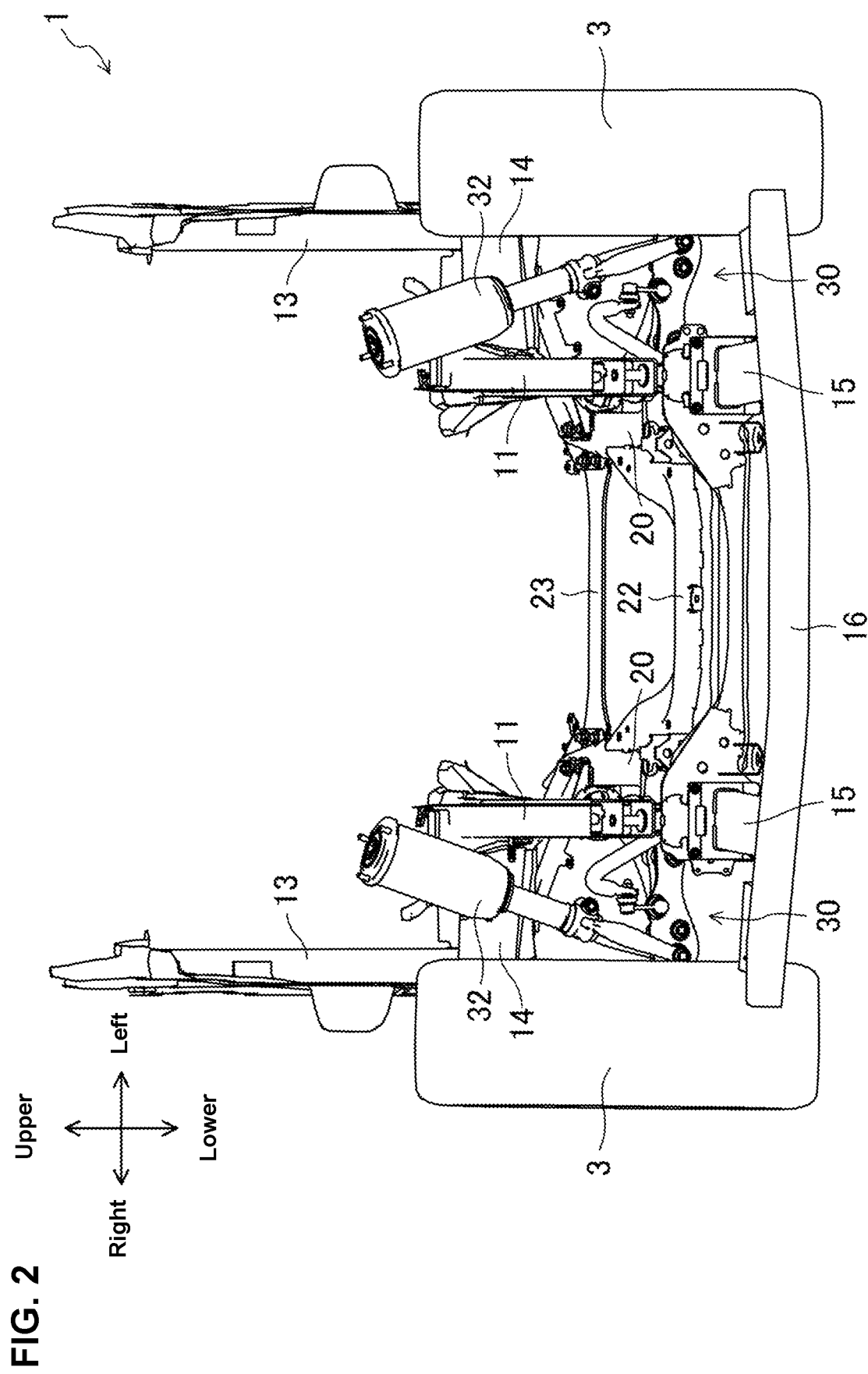
FIG. 2 is a perspective view of the major part of the front portion of the vehicle, when viewed from a forward-and-upward side.

FIGS. 1 and 2 show a major part of a front portion of a vehicle 1 where a suspension device 30 according to the present embodiment is installed. A powertrain room 2 where a powertrain, not illustrated, to drive right-and-left front wheels 3 of the vehicle 1 is arranged is provided at the front portion of the vehicle 1. The powertrain comprises a drive source, such as an engine and/or motor, and a transmission to which a power generated by the drive source is inputted. The powertrain room 2 is formed between a pair of right-and-left front side frames 11. Hereafter, front (forward) side, rear (rearward) side, upper (upward) side, and lower (downward) side of the vehicle 1 will be referred to as "front," "rear," "upper," and "lower" simply in some cases. Likewise, left (leftward) side and right (rightward) side of the vehicle 1, when the vehicle 1 is viewed from the rear side toward the front side, will be referred to as "left" and "right" simply in some cases. Herein, a lateral direction matches a vehicle width direction.

Each of the front side frames 11 extends in a longitudinal direction. A pair of right-and-left floor frames 12 are arranged in back of the pair of front side frames 11, respectively. A pair of right-and-left side sills 13 which extend in the longitudinal direction are arranged on an outward side, in the vehicle width direction, of the pair of floor frames 12, respectively. The left-side front frame 12 and the left-side side sill 13 are connected in the lateral direction by a left-side torque box 14, and the right-side front frame 12 and the right-side side sill 13 are connected in the lateral direction by a right-side torque box 14. Each of the side sills 13 is positioned in back (on the rear (rearward) side) of each of the front wheels 3.

A pair of right-and-left lower frames 20 are provided below the front side frames 11, respectively. Each of the lower frames 20 extends in the longitudinal direction and is curved such that a center, in the longitudinal direction, thereof is positioned on an inward side, in the vehicle width direction, of its front end and its rear end. The right-and-left lower frames 20 are connected to the right-and-left front side frames 11 in a vertical direction, respectively, which is not illustrated.

A crash can 15 is provided at each front end of the right-and-left lower frames 20, and each front end face of the right-and-left a bumper beams 16 is fixed to a bumper beam 16 which extends in the lateral direction.

Respective front end portions of the lower frames 20 are interconnected by a front cross member 21 which extends in the lateral direction. Respective rear end portions of the lower frames 20 are interconnected by a rear cross member 23 which extends in the lateral direction. Respective central portions, in the longitudinal direction, of the lower frames 20 are interconnected by a center cross member 22 which extends in the lateral direction. The front cross member 21, the rear cross member 23, and the center cross member 22 are positioned on the inward side, in the vehicle width direction, of the lower frames 20, respectively.

As shown in FIG. 2, a pair of right-and-left suspension arms 30 are provided on an outward side, in the vehicle width direction, of the lower frames 20. Each of the suspension arms 30 is arranged between the center cross member 22 and the rear cross member 23 in the longitudinal direction. The right-and-left front wheels 3 are coupled to respective outward end portions (front support portions 41 described later), in the vehicle width direction, of the right-and-left suspension devises 30 via respective hub carriers (knuckles). The right-and-left suspension devices 30 are coupled in the lateral direction by an anti-roll bar 31 which extends in the lateral direction.

The right-and-left suspension devices 30 comprise a pair of right-and-left dampers 32. Each of the dampers 32 extends obliquely upwardly-and-inwardly. Specifically, the left-side damper 32 extends obliquely toward an upward-and-rightward side of the vehicle, and the right-side damper 32 extends obliquely toward an upward-and-leftward side of the vehicle. A coil spring is attached to each upper portion of the dampers 32. Each upper end portion of the right-and-left dampers 32 is coupled to each of a pair of right-and-left suspension towers, not illustrated. Since the respective suspension towers constitute a vehicle body, the respective dampers 32 are connected to the vehicle body at their upper portions.

(Suspension Device)

Next, a structure of the suspension device 30 will be described specifically. Herein, since the left-side suspension device 30 and the right-side suspension device 30 are laterally symmetrical, the structure of the right-side suspension device 30 only will be described, and description of the structure of the left-side suspension device 30 is omitted here.

Figure 3:
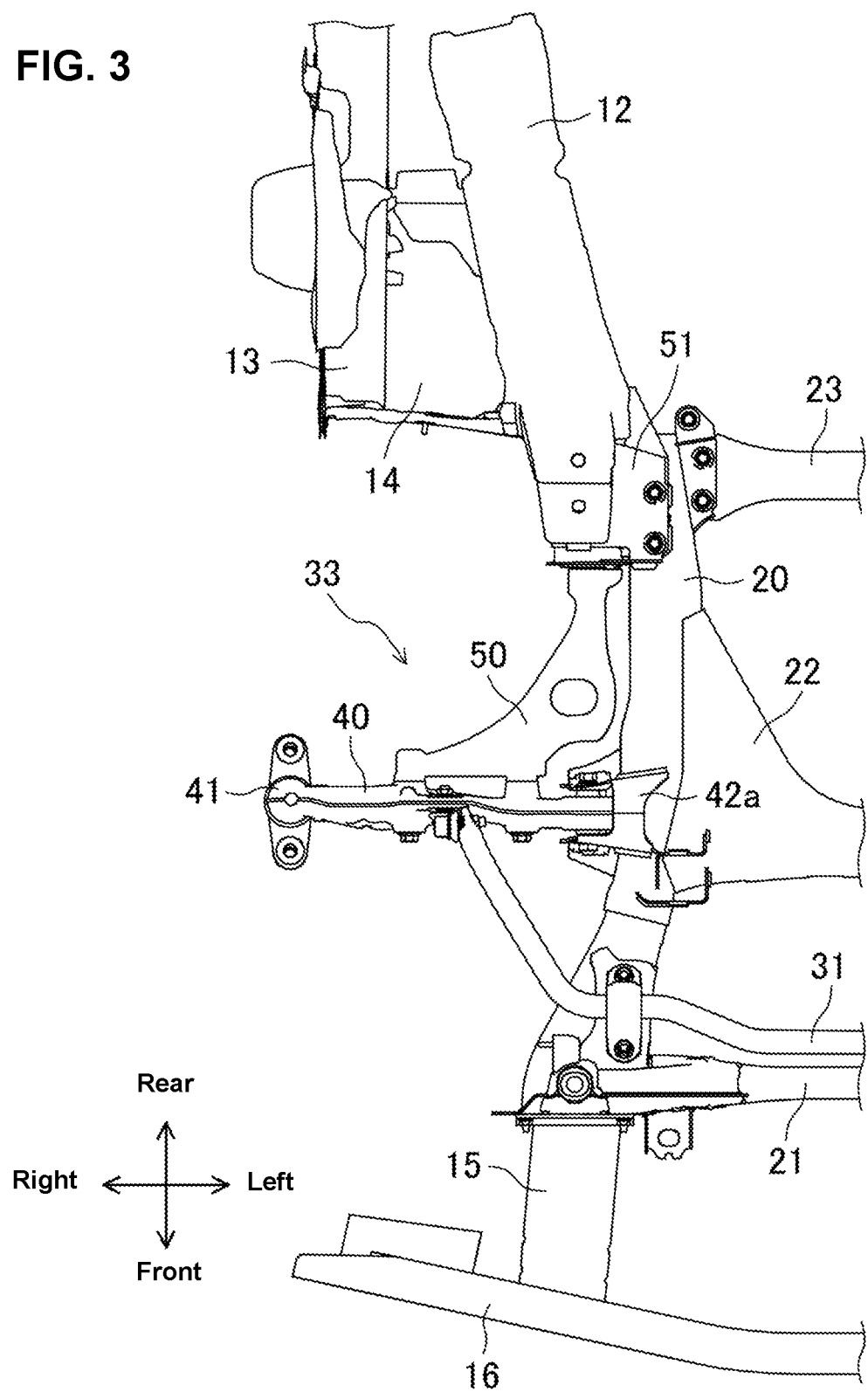
FIG. 3 is an enlarged view showing around a right-side suspension device provided at the front portion of the vehicle.
Figure 4:
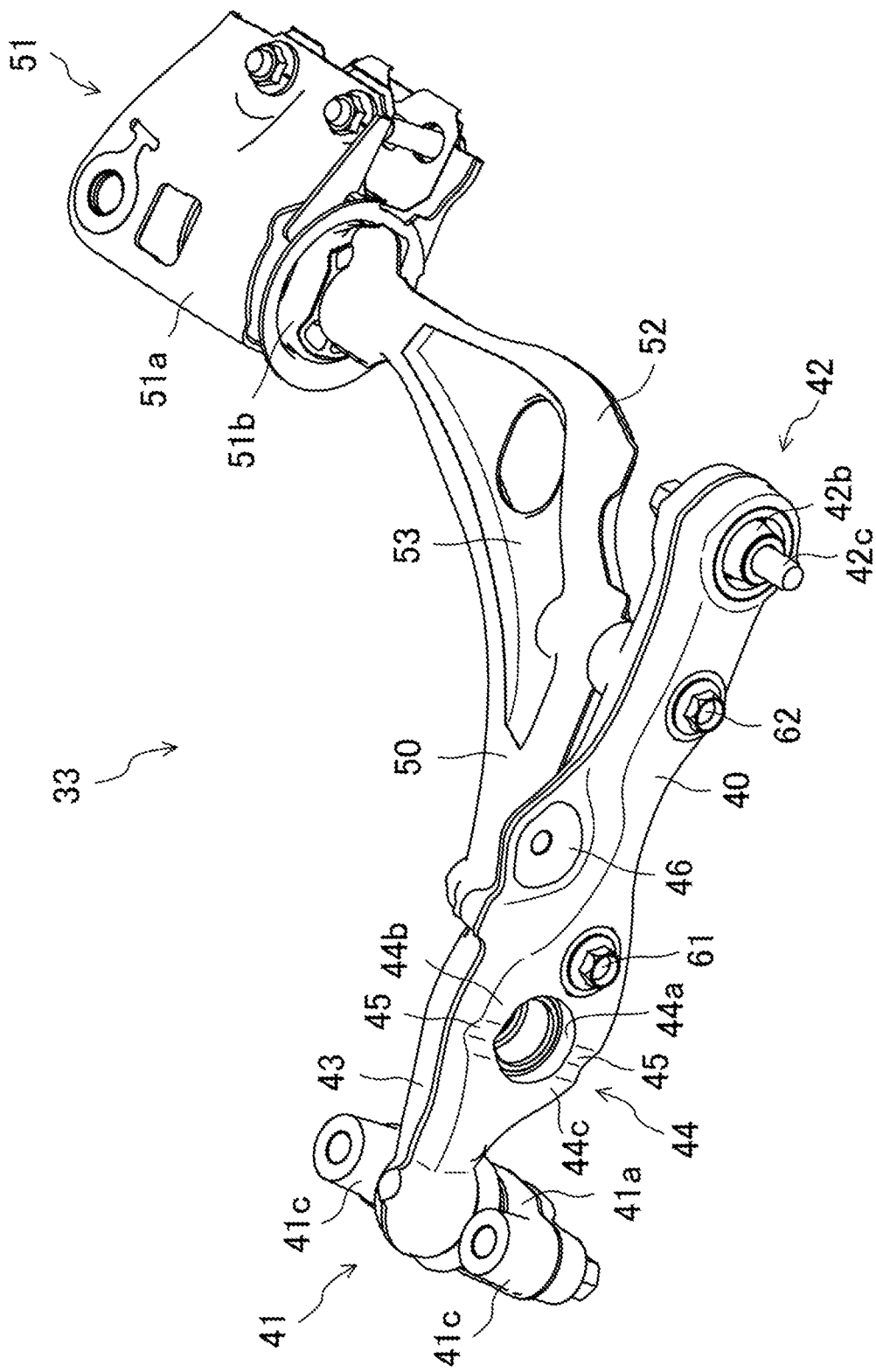
FIG. 4 is a perspective view of a right-side suspension arm, when viewed from an obliquely-upward side.
Figure 5:
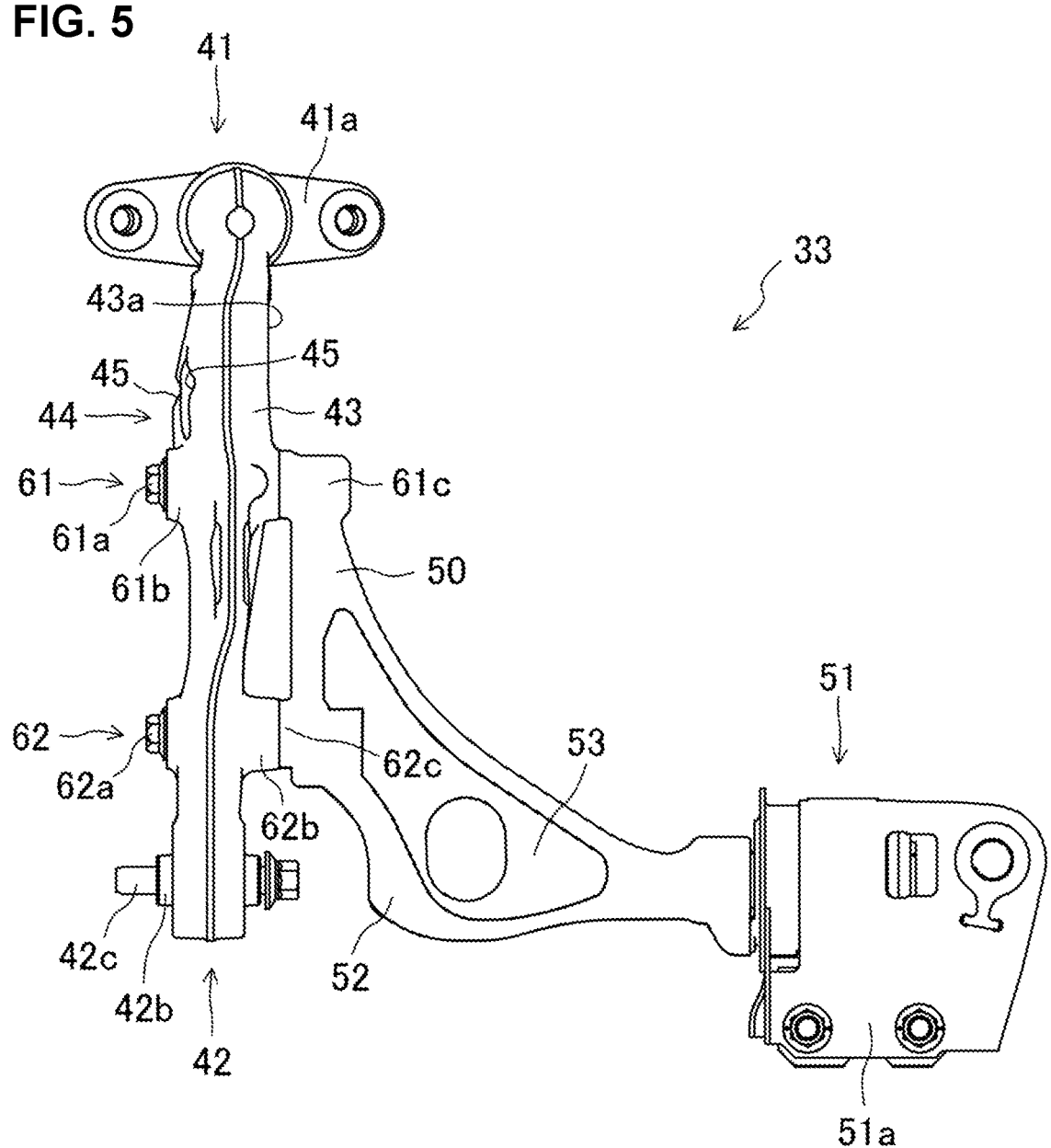
FIG. 5 is a plan view showing the right-side suspension arm.

The suspension device 30 according to the present embodiment is a so-called double wishbone type of suspension device. As shown in FIGS. 3-5, the suspension device 30 comprises a suspension arm 33 (lower arm) which extends in the longitudinal direction and in the lateral direction. The suspension arm 33 comprises a front arm 40 which extends almost straightly in the lateral direction and is positioned on the relatively front side and a rear arm 50 which is positioned in back of the front arm 40 and extends rearwardly toward the left side. The front arm 40 and the rear arm 50 are formed by forging. Herein, in the following description, when the front arm 40 and the rear arm 50 are not distinguished particularly, these are referred to as the suspension arm 33 simply in some cases. Further, in addition to the suspension arm 33, an upper arm, not illustrated, is provided.

The front arm 40 has a front-wheel support portion 41 to support the right-side front wheel 3 at its right-side end portion. The front-wheel support portion 41 has a bracket 41a. The bracket 41a is fixedly attached to the right-side end portion of the front arm 40 by a bolt and a nut 41b (see FIG. 6). The bracket 41a has a pair of bosses 41c which are separated from each other in the longitudinal direction. The above-described hub carrier is attached to an upper side of the front-wheel support portion 41. Each of the bosses 41c is configured such that a bolt is inserted into this from above, and the hub carrier is configured to be fixed to the front-wheel support portion 41 by fastening the bolt with a nut at its lower side.

As shown in FIG. 3, the front arm 40 has a first vehicle-body attachment portion 42 which is attached to the central portion of the lower frame 20 at its left-side end portion. That is, the first vehicle-body attachment portion 42 is attached to a vehicle-body member (the right-side lower arm 20) of the vehicle 1 such that it is positioned on the inward side, in the vehicle width direction, of the front-wheel support portion 41. The first vehicle-body attachment portion 42 comprises a first bracket 42a, a first cylindrical member 42b (see FIGS. 4 and 6), and a first support axis 42c (see FIGS. 4 and 6). The first cylindrical member 42b comprises an inner cylinder where the first support axis 42c is inserted, a rubber bush which is arranged around the inner cylinder, and an outer cylinder which is positioned outside the rubber bush. The first bracket 42a is attached to and supported at the first support axis 42c. The front arm 40 is rotatable around the first support axis 42c relative to the vehicle body in a state where the first bracket 42a is fixed to the vehicle-body member (the lower frame 20). Especially, since the first support axis 42c is provided to extend in the longitudinal direction, the front arm 40 is rotatable in the vertical direction.

Figure 6:
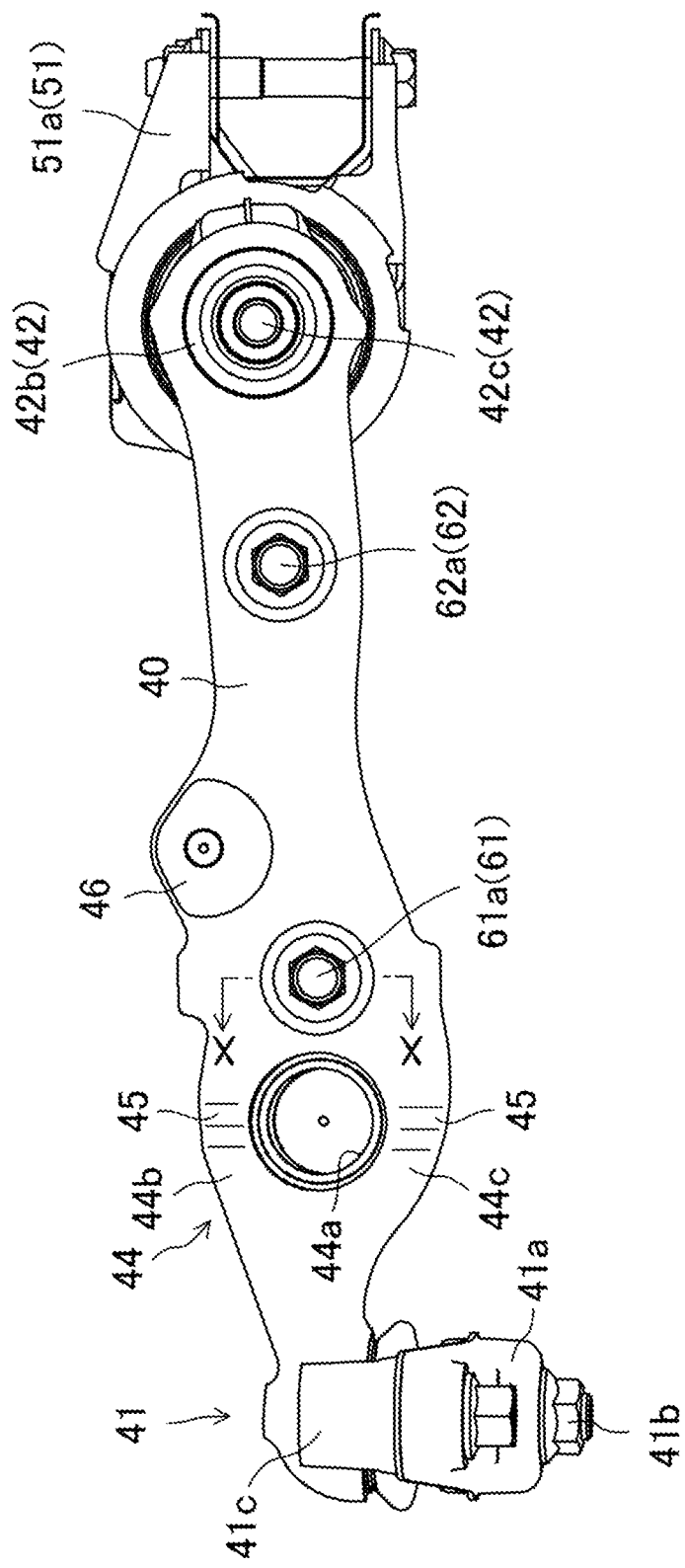
FIG. 6 is an elevational view showing the right-side suspension arm.

As shown in FIGS. 4-6, the front arm 40 has a damper support portion 44 to support the damper 32 at a portion of the front arm 40 which is positioned in the vicinity of the front-wheel support portion 41. More specifically, the damper support portion 44 is provided at an outside portion 43 of the front arm 40 which is positioned on the right side (the outward side, in the vehicle width direction) of a right-side end portion of the rear arm 50. The damper support portion 44 is formed in the vicinity of a left-side end portion of the outside portion 43. Accordingly, an area of the front arm 40 which extends from the damper support portion 44 to the front-wheel support portion 41 can be described as the outside portion 43. The outside portion 43 extends straightly in the lateral direction (the vehicle width direction).

The damper support portion 44 has a hole 44a which penetrates in the longitudinal direction. The hole portion 44a stores a lower end portion of the damper 32. Respective portions (hereafter, referred to as a support upper portion 44b and a support lower portion 44c) of the damper support portion 44 which are located above and below the hole portion 44a are configured to have a thinner thickness, in the vertical direction, than any other portion of the front arm 40.

The damper support portion 44 has a breakage ease portion 45. The breakage ease portion 45 becomes a breakage causing point in a case where there occurs a so-called small overlap collision where a portion of a front face of the vehicle 1 which is positioned on the outward side, in the vehicle width direction, of the lower frame 20 hits against an obstacle 71 (see FIGS. 11-14). This breakage ease portion 45 is provided at two points, i.e., at respective front faces of the support upper portion 44b and the support lower portion 44c. That is, the breakage ease portion 45 is formed at another part of the damper support portion 44 than the hole portion 44a. The breakage ease portion 45 is formed by a groove portion which is configured to be recessed in the longitudinal direction, particularly a groove portion which is configured to be recessed from the front side to the rear side in an inverse triangular shape.

The breakage ease portion 45 is configured to get broken when a load having a specified value or grater is applied to the front wheel 3 from the front side. When the breakage ease portion 45 gets broken, the front wheel 3 comes to be separated from the suspension arm 33 together with the front support portion 41. The above-described specified value of the load is set to be slightly smaller than a load value which causes the front wheel 3 moving rearward in the small overlap collision to contact a part of the vehicle body positioned behind the front wheel 3 and also a load value which may cause small deformation at this part of the vehicle body even if the front wheel's contacting happens.

Figure 7:
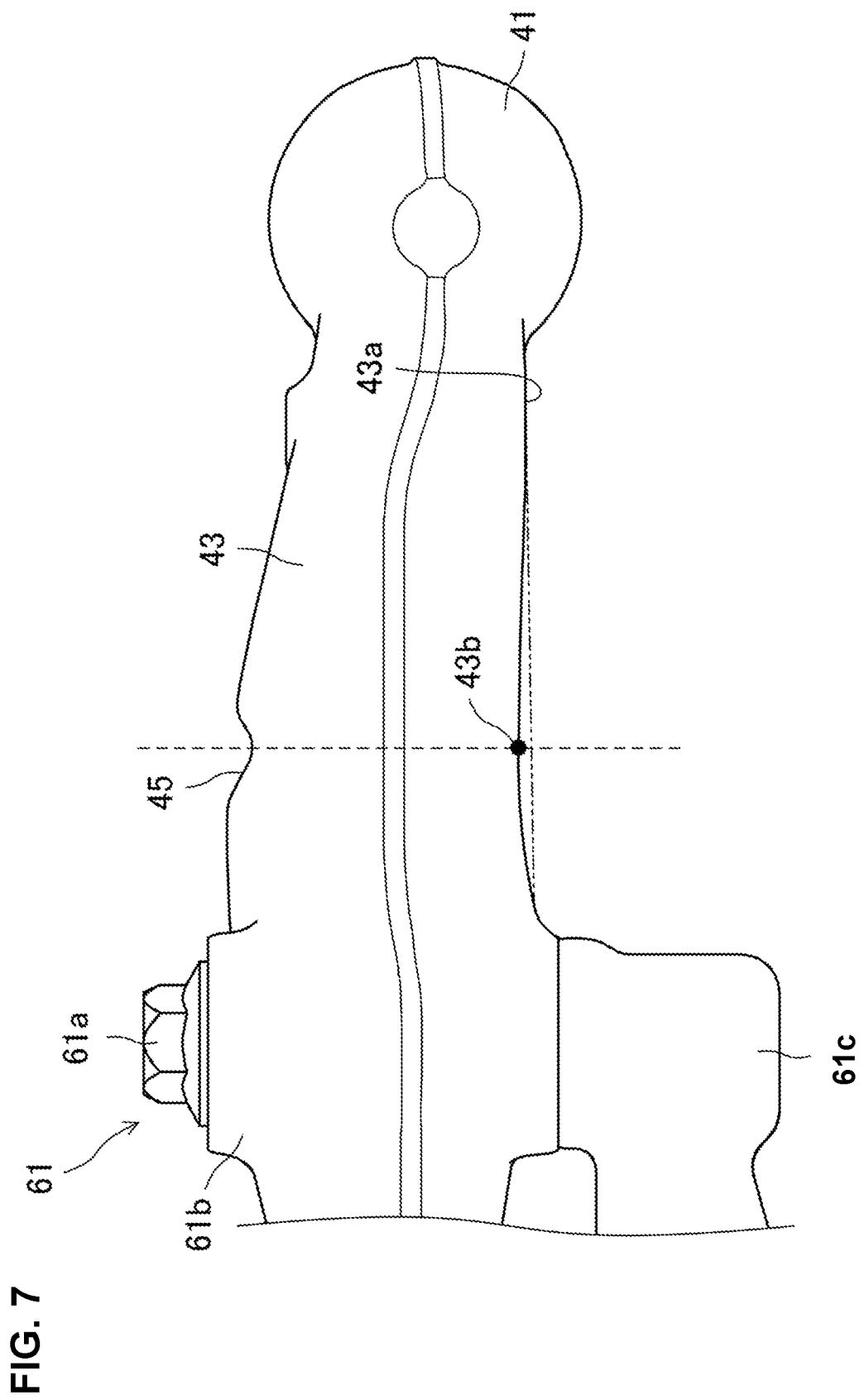
FIG. 7 is an enlarged view showing an outside portion of the right-side suspension arm.

As shown in FIG. 7, a rear face portion 43a of the outside portion 43 is of an arch shape which is curved toward the front side in the plan view such that a central portion, in the lateral direction, thereof is positioned on the front side of both-side end portions, in the lateral direction, thereof. A curve top portion 43b which is located at the foremost position of the rear face portion 43a is positioned in back of the breakage ease portion 45. Specifically, a position, in the lateral direction, of the curve top portion 43b and a position, in the lateral direction, of the breakage ease portion 45 are set to be the same.

A bar support portion 46 to support the anti-roll bar 31 is formed at a central upper portion, in the lateral direction, of the front arm 40.

The rear arm 50 has a second vehicle-body support portion 51 which is attached to a rear end portion of the lower frame 20 at its rear end. The second vehicle-body support portion 51 is positioned on the inward side, in the vehicle width direction, of the front-wheel support portion 41. The second vehicle-body support portion 51 comprises a second bracket 51a and a second cylindrical member 51b. The second cylindrical member 51b is fixed to the second bracket 51a by welding. Inside the second cylindrical member 51b are provided a second support axis (not illustrated) and a rubber bush (not illustrated) which is arranged around the second support axis. The second support axis extends in parallel to the first support axis 42c. The second bracket 51a is fixed to a rear end portion of the lower arm 20 by a bolt. The rear arm 50 is rotatable around the above-described support axis relative to the vehicle body in a state where the second bracket 51a is fixed to the vehicle-body member (lower arm 20). In particular, since the second support axis is provided to extend in the longitudinal direction in parallel to the first support axis 42c, the rear arm 50 is rotatable in the vertical direction. Accordingly, a whole part of the suspension arm 33 provided with the front arm 40 and the rear arm 50 is configured to be rotatable in the vertical direction relative to the vehicle body.

A left-side part of the rear arm 50 is a protrusion portion 52 which is configured to protrude forwardly. Since a width, in the lateral direction, of the rear arm 50 can be made as large as possible by forming the protrusion portion 52, the bending rigidity, in a horizontal direction, of the rear arm 50 increases. Accordingly, the protrusion portion 52 can suppress the deformation amount of the rear arm 50 in the small overlap collision.

A recess portion 53 which is configured to be recessed downwardly is formed at a whole part of an upper face portion of the rear arm 50. Further, a recess portion which is configured to be recessed upwardly is formed at a whole part of a lower face portion of the rear arm 50, which is not illustrated.

The front arm 40 and the rear arm 50 are fixed together at a first connection portion 61 which is positioned relatively on the outward side, in the vehicle width direction, thereof and a second connection portion 62 which is positioned on the inward side, in the vehicle width direction, of the first connection portion 61. The first connection portion 61 is positioned at a right-side end portion (an outward end portion, in the vehicle width direction) and the second connection portion 62 is positioned at a central portion, in the lateral direction, of the rear arm 50.

As shown in FIG. 5, the first connection portion 61 has a first insertion portion 61b which is provided at the front arm 40 and where a bolt 61a is inserted and a first fastening portion 61c which is provided at the rear arm 50 and where a bolt 61a is fastened. No screw is formed inside a penetration hole which is formed at the first insertion portion 61b, and the first insertion portion 61b is not screwed with the bolt 61a.

Figure 8:
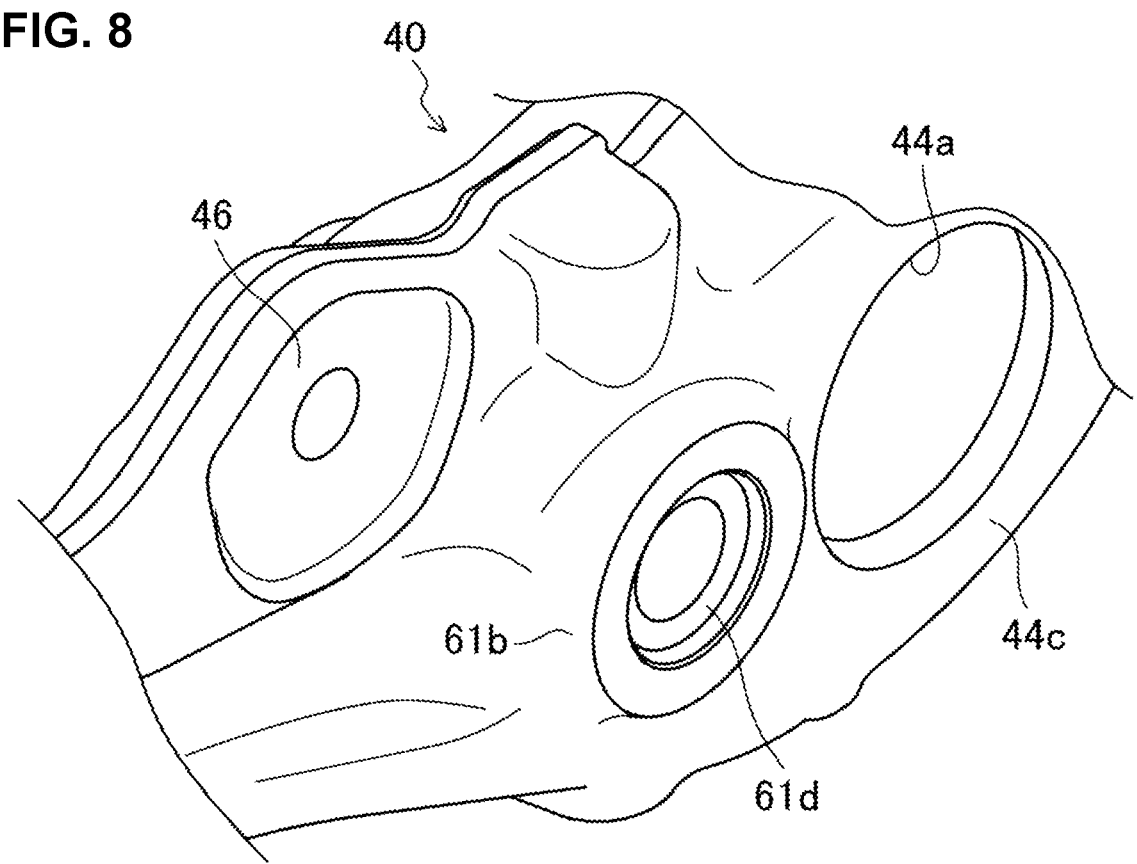
FIG. 8 is a perspective view showing a rear-side portion of a first insertion portion.
Figure 9:
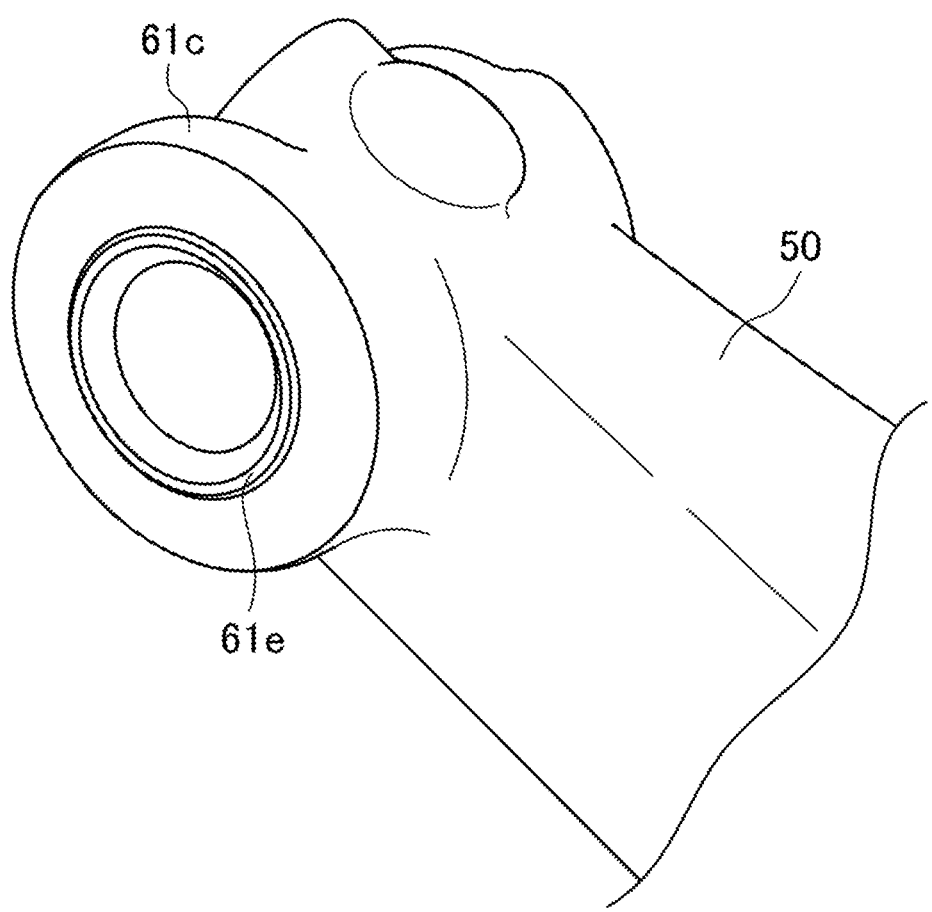
FIG. 9 is a perspective view showing a front-side portion of a first fastening portion.
Figure 10:
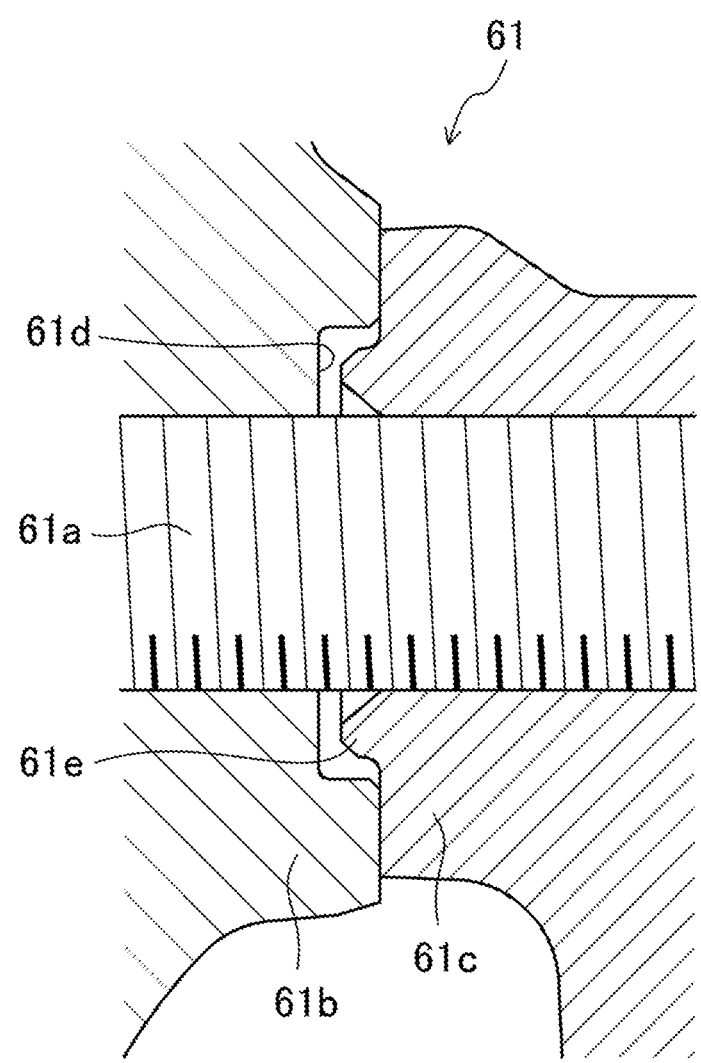
FIG. 10 is a sectional view taken along line X-X of FIG. 6.

As shown in FIGS. 8 and 10, a first recess portion 61d which is configured to be recessed forwardly is formed at a whole periphery of the penetration hole is formed at a rear end portion of the first insertion portion 61b. Meanwhile, as shown in FIGS. 9 and 10, a first protrusion portion 61e which is configured to protrude forwardly is formed at a position of a front end portion of the first fastening portion 61c which corresponds to the first recess portion 61d. The first protrusion portion 61e is formed over a whole periphery of a fastening hole of the first fastening portion 61c so as to surround its periphery. In a state where the front arm 40 is fixed to the rear arm 50, i.e., the bolt 61a is fastened to the first fastening portion 61c, the first protrusion portion 61e is stored inside the first recess portion 61d. Thereby, even if the front arm 40 and the rear arm 50 move relatively in a different direction in the small overlap collision, the first protrusion portion 61e contacts a wall portion of the first recess portion 61d, so that the relative moving of the first insertion portion 61b and the first fastening portion 61c is suppressed. Consequently, in the small overlap collision, a shearing stress is not easily applied to the bolt 61a and the fixation state of the first connection portion 61 is maintained.

Meanwhile, similarly to the first connection portion 61, the second connection portion 62 has a second insertion portion 62b which is provided at the front arm 40 and where a bolt 62a is inserted and a second fastening portion 62c which is provided at the rear arm 50 and where a bolt 62a is fastened. No screw is formed inside a penetration hole (not illustrated) which is formed at the second insertion portion 62b, and the second insertion portion 62b is not screwed with the bolt 62a.

The second insertion portion 62b of the second connection portion 62 does not have the recess portion which the first insertion portion 61b has. Further, the second fastening portion 62c of the second connection portion 62 does not have the protrusion portion which the first fastening portion 61c has, either.

Herein, the first protrusion portion 61e may be formed integrally with the first fastening portion 61c or be formed by fixing a separate sleeve or the like. Further, the first protrusion portion 61e may be formed at the first insertion portion 61b and the first recess portion 61d may be formed at the first fastening portion 61c. Moreover, it is unnecessary that the first protrusion portion 61e is formed over the whole periphery of the first fastening portion 61c as long as it is provided at the both-side positions, in the vehicle width direction, of the bolt 61a, especially at the position located on the outward side, in the vehicle width direction, of the bolt 61a. Also, similarly to the first connection portion 61, the second connection portion 62 may be configured such that the recess portion is formed at any one of second insertion portion 62b and the second fastening portion 62c and the protrusion portion which is configured to protrude toward an inside of the recess portion is formed at the other one.

(Moving of Suspension Arm in Small Overlap Collision)

Next, moving of the right-side suspension arm 33 when there occurs the small overlap collision of the right-side portion of the front face of the vehicle 1 with the obstacle 71 will be described referring to FIGS. 11-14.

Figure 11:
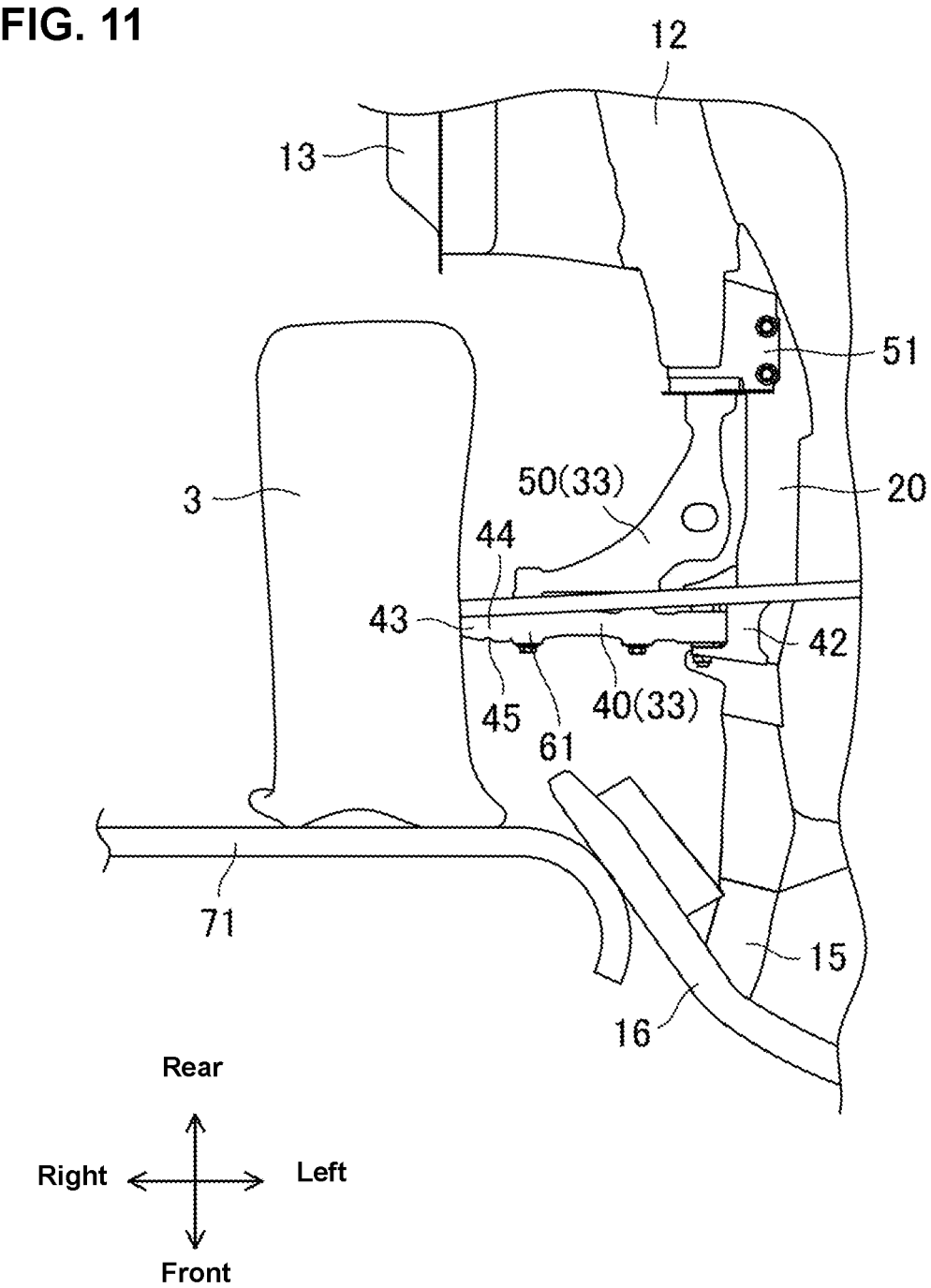
FIG. 11 is a plan view schematically showing a state before deformation of the right-side suspension arm when a collision load is applied to a right-side front wheel in a case where there occurs a small overlap collision of a right-side portion of a front face of the vehicle against an obstacle.

When the obstacle 71 moves rearwardly further relative to the vehicle 1, as shown in FIG. 11, the obstacle 71 hits against the right-side front wheel 3 and the load (collision load) is applied to the front wheel 3 from the front side. Thereby, the load is applied to the front-wheel support portion 41 of the suspension arm 33.

Figure 12:
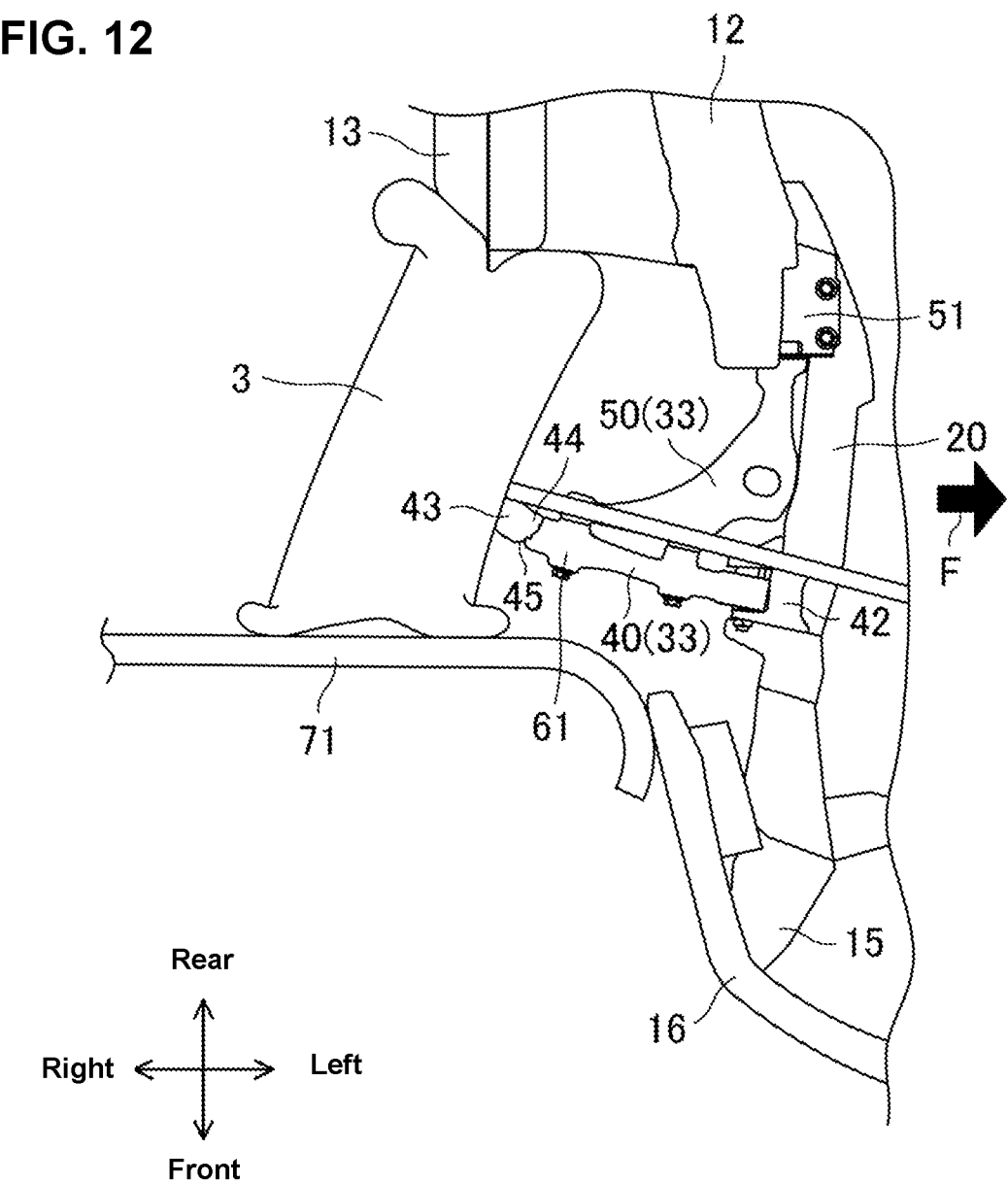
FIG. 12 is a plan view schematically showing a state of the deformation of the right-side suspension arm when the obstacle moves rearwardly further relative to the vehicle from the state shown in FIG. 11, which shows a state before breakage of the right-side suspension arm.

As the obstacle 71 moves rearwardly further relative to the vehicle 1, as shown in FIG. 12, the front-wheel support portion 41 moves rearwardly together with the front wheel 3. Since the left-side end portion of the suspension arm 33 is connected to the vehicle body at the first and second vehicle-body attachment portions 42, 51, the suspension arm 33 is curved and deformed such that its right side is positioned on the more rearward side of the vehicle when the rearwardly-directed load is applied to the front wheel 3. Herein, the portion of the front arm 40 which is positioned on the left side of the first connection portion 61 is not easily deformed because the rear arm 50 receives the load. In particular, since the first connection portion 61 is configured such that the bolt 61a is not easily sheared due to an uneven (concave/convex) structure formed by the first recess portion 61d and the first protrusion portion 61e, a connected state of the first connection portion 61 is maintained even if the front arm 40 is curved and deformed, so that the load can be received at the rear arm 50. Meanwhile, since the rear arm 50 is not positioned in back of the outside portion 43 of the front arm 40 and therefore the load is received only at the outside portion 43, the outside portion 43 is deformed easily. Herein, since the damper support portion 44 of the outside portion 43 is connected to the vehicle body via the damper 32, this portion 44 is not so easily deformed. Accordingly, when the rearwardly-directed load is applied to the front wheel 3, the portion of the outside portion 43 which is positioned on the outside of the damper support portion 44 is greatly curved and deformed toward the rearward side of the vehicle in particular. Thereby, the load is applied intensively to the breakage ease portion 45 of the damper support portion 44.

Further, since the suspension arm 33 is curved and deformed, a reaction force F including a laterally-directed element is applied to the vehicle body from the suspension arm 33.

Also, since the suspension arm 33 is curved and deformed, the front wheel 3 contacts the vehicle body (right-side side sill 13) in a state where it is inclined such that its front side is positioned on the rightward side of its rear side.

Figure 13:
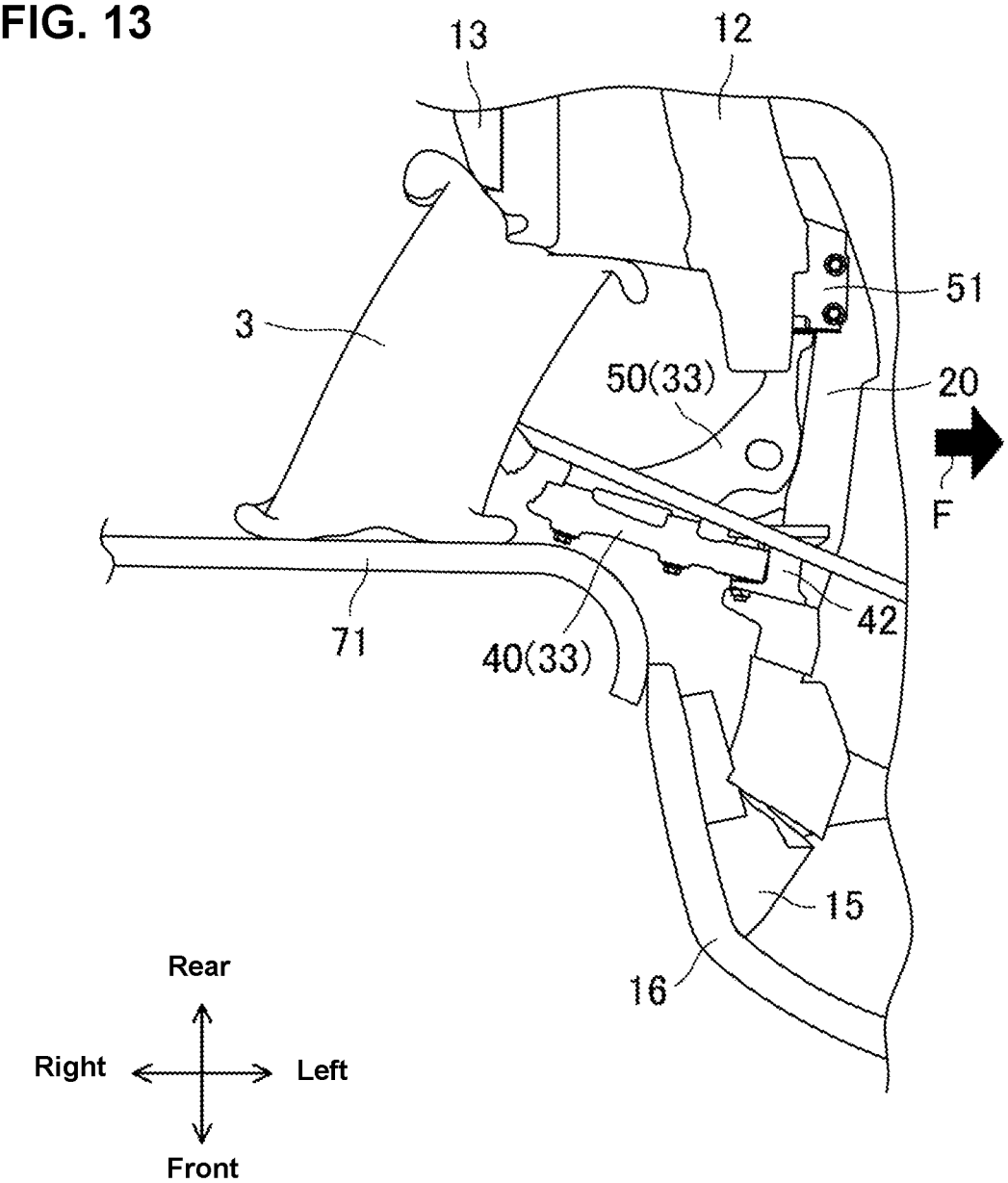
FIG. 13 is a plan view showing a state of the breakage of the right-side suspension arm when the obstacle moves rearwardly further relative to the vehicle from the state shown in FIG. 12.
Figure 14:
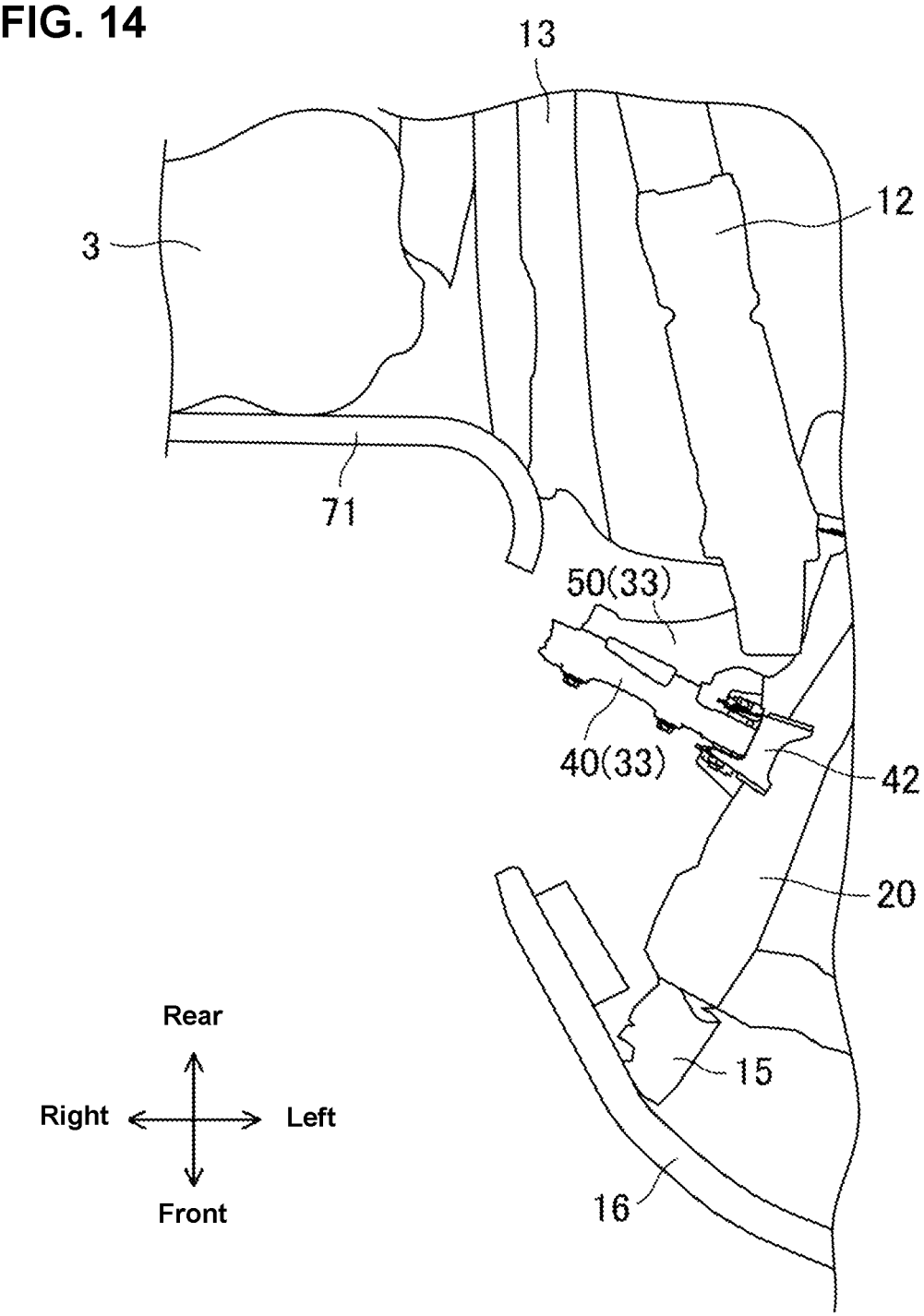
FIG. 14 is a plan view showing a state where the right-side front wheel moves toward a rightward-and-rearward side relative to the vehicle when the obstacle moves rearwardly further relative to the vehicle from the state shown in FIG. 13.

Then, when the obstacle 71 moves rearwardly further relative to the vehicle 1 and the load having the specified value or greater is applied to the breakage ease portion 45, as shown in FIG. 13, the front arm 40 comes to get broken at the position of the breakage ease portion 45. Thereby, the front wheel 3 comes to be separated from the vehicle body together with the front-wheel support portion 41. Further, since the damper support portion 44 gets broken, connection of the damper 32 and the front arm 40 becomes weak.

After this, as the obstacle 71 moves rearwardly further relative to the vehicle 1, the load is applied to a portion of the suspension arm 33 which is still connected to the vehicle body after the breakage (hereafter, referred to as a residual portion). Since connection of this residual portion to the damper 32 becomes weak, the residual portion is easily curved and deformed by the load. Thereby, a laterally-directed force (a laterally-directed element of the above-described reaction force F) to separate the vehicle body from the front wheel 3 is applied to the vehicle body, so that the vehicle body moves laterally (so-called glance-off). Moreover, since the front wheel 3 is separated from (is made to leave) the vehicle body and has the inclined position and its rear portion contacts the vehicle body, the front wheel 3 moves such that it rotates toward the right side around its contact point to the vehicle body when the rearwardly-directed load is applied. Consequently, the front wheel 3 and the vehicle body leave (separate from) each other.

Even in a case where the small overlap collision occurs at the left-side portion of the front face of the vehicle 1 and the collision load is applied to the left-side front wheel 3 from the front side, similarly to a case of the right-side suspension arm 33, the left-side suspension arm 33 is curved and deformed, and the left-side front wheel 3 and the vehicle body leave each other due to the breakage of the left-side front arm 40 at the breakage ease portion 45.

Thus, since it is suppressed that the vehicle body is deformed by the front wheel 3 even if the front wheel 3 moves rearwardly, the deformation of the vehicle body in the small overlap collision can be properly suppressed.

Features of Present Embodiment

In the present embodiment, the front suspension device comprises the suspension arm 33, one end of which has the front-wheel support portion 41 to support the front wheel 3 of the vehicle 1 and the other end of which is positioned on the inward side, in the vehicle width direction, of the front-wheel support portion 41 and has the first and second vehicle-body attachment portions 42, 52 to be attached to the vehicle-body member of the vehicle 1, and the damper 32 supported at the damper support portion 44 which is provided at the portion of the suspension arm 33 which is positioned in the vicinity of the front-wheel support portion 41 at its lower portion and connected to the vehicle-body member at its upper portion, wherein the damper support portion 44 of the suspension arm 33 has the breakage ease portion 45. According to this structure, when the load is applied to the front-wheel support portion 41 via the front wheel 3 in the small overlap collision, the suspension arm 33 is curved and deformed and gets broken at the breakage ease portion 45. Thereby, the front wheel 3 comes to be separated from the vehicle body, and the laterally-directed force is applied to the vehicle body by the reaction force from the suspension arm 33. Consequently, since the front wheel 3 and the vehicle body leave (separate from) each other, it is suppressed that the vehicle body is deformed by the front wheel 3 even if the front wheel 3 moves rearwardly. Accordingly, the deformation of the vehicle body in the small overlap collision can be properly suppressed.

In the present embodiment, the damper support portion 44 has the hole portion 44a which stores the lower end portion of the damper 32 and penetrates in the vehicle longitudinal direction, and the breakage ease portion 45 is provided at another portion of the damper support portion 44a than the hole portion 44a. According to this structure, the portion where the breakage ease portion 45 is provided has the thin thickness compared to any other portion of the suspension arm 33. Accordingly, since the suspension arm 33 is caused to get broken easily at the breakage ease portion 45 in the small overlap collision, the deformation of the vehicle body in the small overlap collision can be suppressed more effectively.

In the present embodiment, the breakage ease portion 45 is positioned at the both points of the damper support portion 44 which are located on the upper side and the lower side of the hole portion 44a, respectively. According to this structure, since the suspension arm 33 is caused to get broken easily at the breakage ease portion 45 in the small overlap collision, the deformation of the vehicle body in the small overlap collision can be suppressed more effectively.

In the present embodiment, the breakage ease portion 45 is the groove portion which is configured to be recessed in the vehicle longitudinal direction. According to this structure, when the collision load directed from the vehicle forward side to the vehicle rearward side is applied to the suspension arm 33 in the small overlap collision, the suspension arm 33 is caused to get broken easily at the breakage ease portion 45. Thereby, suppression of the deformation of the vehicle body in the small overlap collision can be attained more effectively.

In the present embodiment, the rear face portion 43a of the outside portion 43 of the suspension arm 33 is of the arch shape which is curved toward the vehicle forward side in the plan view. According to this structure, the outside portion 43 is deformed easily such that the front face portion is bent in a ridge-holding manner due to the collision load in the small overlap collision. Therefore, if the breakage ease portion 45 is provided at the damper support portion 44, the suspension arm 33 is deformed easily at the breakage ease portion 45. Thereby, the deformation of the vehicle body in the small overlap collision can be suppressed more effectively.

In the present embodiment, the breakage ease portion 45 is the groove portion which is formed at the front face portion of the damper support portion 44 and configured to be recessed in the vehicle longitudinal direction. According to this structure, when the front face portion is deformed in the ridge-holding manner, the breakage ease portion 45 causes the breakage of the suspension arm 33 especially. Thereby, the suppression of the deformation of the vehicle body in the small overlap collision can be attained more effectively.

In particular, in the present embodiment, the position, in the vehicle width direction, of the breakage ease portion 45 is the same as the position, in the vehicle width direction, of the curve top portion 43b of the rear face portion 43a which is positioned on the foremost side. According to this structure, since the front face portion is easily deformed in the ridge-holding manner at the position of the breakage ease portion 45, the breakage ease portion 45 causes the breakage of the suspension arm 33. Thereby, the deformation of the vehicle body in the small overlap collision can be suppressed more effectively.

Further, in the present embodiment, the suspension arm 33 comprises the front arm 40 which extends straightly in the vehicle width direction and the rear arm 50 which is positioned in back of the front arm 40 and connected to the front arm 40, and the outward end portion, in the vehicle width direction, of the rear arm 50 is positioned on the inward side, in the vehicle width direction, of the damper support portion 44. According to this structure, the outside portion 43 of the front arm 40 including the damper support portion 44 is considerably easily deformed in the small overlap collision, compared to the portion of the front arm 40 which is positioned on the inward side, in the vehicle width direction, of the outside portion 43. Thereby, the breakage ease portion 45 causes the breakage of the suspension arm 33 easily in the small overlap collision. Further, since the residual portion of the suspension arm 33 after the breakage does not have buckling easily, a laterally-directed force which is caused by compressive deformation of the residual portion can be effectively generated. Consequently, the suppression of the deformation of the vehicle body in the small overlap collision can be attained more effectively.

In the present embodiment, the suspension arm 33, including the front arm 40 and the rear arm 50, is formed by forging. According to this structure, since the rigidity of a whole part of the suspension arm 33 can be increased, the support performance of the suspension arm 33 in a normal state can be sufficiently improved. Further, increasing of the rigidity of the whole part of the suspension arm 33 can easily cause breakage of the portion which has the lower rigidity than any other portion like the breakage ease portion 45. Moreover, since the residual portion of the suspension arm 33 after the breakage does not have buckling easily, the laterally-directed force which is caused by the compressive deformation of the residual portion can be effectively generated, so that the suppression of the deformation of the vehicle body in the small overlap collision can be attained more effectively.

Other Embodiments

The present invention is not limited to the above-described embodiment, and any other modifications are applicable within a scope of the claimed invention.

For example, while the breakage ease portion 45 is formed at the front face portion of the damper support portion in the above-described embodiment, that portion 45 may be formed at a rear face portion of the damper support portion 44. According to this modified structure, since the front face portion of the suspension arm 33 comes to be easily deformed in the ridge-holding manner at the position of the breakage ease portion 45 in the small overlap collision, the load acts on the front face of the damper support portion 44 in the deformation. Thereby, the suspension arm 33 gets broken such that it is torn up at the position of the damper support portion 44. Accordingly, this modified structure can cause the breakage of the suspension arm 33 at the breakage ease portion 45 as well.

Further, while the breakage ease portion 45 is formed at the both points of the support upper portion 44b and the support lower portion 44c in the above-described embodiment, that portion 45 may be formed only at any one of the support upper portion 44*b* and the support lower portion 44*c*. Even in this structure as well, if the one of these portions 44*b*, 44*c* where the breakage ease portion 45 is provided gets broken, the large load comes to act on the other one, so that the suspension arm 33 gets broken eventually.

Moreover, while the rear face portion 43*a* of the outside portion 43 of the front arm 40 is of the arch shape which is curved toward the vehicle forward side in the plan view in the above-described embodiment, that portion 43*a* may be configured to extend straightly in the vehicle width direction.

The above-described embodiments are merely the exemplified examples and therefore the claimed invention should not be construed limitedly based on the above-described embodiments. The scope of the present invention is specified by the claims and any modifications and improvements of the present invention which belong to the equivalents of the claimed invention should be within the scope of the present invention as well.

The above-described present invention is useful as the front suspension device which can suppress the deformation of the vehicle body as much as possible in the small overlap collision.

What is claimed is:

1. A front suspension device, comprising:
   a suspension arm, one end of which has a front-wheel support portion to support a front wheel of a vehicle and the other end of which is positioned on an inward side, in a vehicle width direction, of said front-wheel support portion and has a vehicle-body attachment portion to be attached to a vehicle-body member of the vehicle; and
   a damper supported at a damper support portion which is provided at a portion of said suspension arm which is positioned in the vicinity of said front-wheel support portion at a lower portion thereof and connected to the vehicle-body member at an upper portion thereof,
   wherein said damper support portion of the suspension arm has a breakage ease portion to cause breakage of the suspension arm,
   wherein the suspension arm comprises a front arm having the damper support portion and extending in the vehicle width direction, and a rear arm connected to the front arm, the rear arm being located behind the front arm and extending rearward in a vehicle longitudinal direction,
   wherein an outward end portion in the vehicle width direction of the rear arm is disposed on an inward side in the vehicle width direction of the damper support portion.

2. The front suspension device of claim 1, wherein said damper support portion of the suspension arm has a hole portion which engages a lower end portion of said damper and penetrates in the vehicle longitudinal direction, and said breakage ease portion is provided at another portion of the damper support portion than said hole portion.

3. The front suspension device of claim 2, wherein said breakage ease portion is positioned at both points of said damper support portion which are located on an upper side and a lower side of said hole portion, respectively.

4. The front suspension device of claim 1, wherein said breakage ease portion is a groove portion which is configured to be recessed in a vehicle longitudinal direction.

5. The front suspension device of claim 1, wherein a rear face portion of an outside portion of the front arm of said suspension arm which extends from said damper support portion to said front-wheel support portion is of an arch shape which is curved toward a vehicle forward side in a plan view.

6. The front suspension device of claim 5, wherein said breakage ease portion is a groove portion which is formed at a front face portion of said damper support portion and configured to be recessed in a vehicle longitudinal direction.

7. The front suspension device of claim 6, wherein a position, in the vehicle width direction, of said breakage ease portion is the same as a position, in the vehicle width direction, of a curve top portion of said rear face portion which is positioned on a foremost side.

8. The front suspension device of claim 7, wherein said suspension arm is formed by forging.

9. The front suspension device of claim 1, wherein said suspension arm is formed by forging.

* * * * *